Patented Nov. 26, 1929

1,737,384

UNITED STATES PATENT OFFICE

CLAYTON OLIN NORTH AND WINFIELD SCOTT, OF AKRON, OHIO, ASSIGNORS TO THE RUBBER SERVICE LABORATORIES CO., OF AKRON, OHIO, A CORPORATION OF OHIO

MANUFACTURE OF ALDEHYDE-AMINE REACTION PRODUCTS

No Drawing.   Application filed April 8, 1926.   Serial No. 100,684.

The present invention is directed to the process of manufacturing certain aldehyde-amine reaction products. The invention is also directed to the vulcanization of rubber by a process wherein a new compound obtained as hereinafter described and possessing desirable characteristics for the use desired, is employed as an accelerator of the vulcanization process. The invention will be readily understood from the following specification wherein the novelty of the process is fully set forth and described.

Various types of compounds have been described heretofore as accelerators of the rubber vulcanization process. Among such compounds are the aldehyde-amine reaction products which have been developed recently and are now widely employed for this purpose. For example, British Patent No. 7370 of 1914 to Peachy, French Patent No. 470,833 to Bastide, and United States Patent No. 1,417,970 to Cadwell all disclose as accelerators, the use of compounds obtained by the condensation of equi-molecular proportions of aldehydes and amines. A more recent patent to North (U. S. Patent No. 1,467,984) claims as accelerators of the rubber vulcanization process, those compounds obtained by treating the simple reaction products of aldehydes and amines first formed, that is Schiff's bases with a further quantity of an aldehyde. The process of manufacturing compounds of this type is described and claimed in a copending application Serial No. 627,326 filed by C. O. North on March 24, 1923. Furthermore, the process of manufacturing a product of this general type by reacting an aldehyde with an amine in other than equi-molecular proportions and then reacting the product so formed with a further quantity of the same or a different aldehyde is claimed in another copending application Serial No. 627,325 filed March 24, 1923, by C. O. North.

Aldehydes and amines, particularly the aliphatic aldehydes and the primary aromatic amines, not only combine in equi-molecular proportions as well as in other ratios as are set forth in the applications mentioned to produce reaction products but also react in the proportion of two molecules of the amine to one molecule of an aldehyde to form compounds known as dianilides which are classified among the substances known as Schiff's bases. The aldehyde reaction products of the dianilides have been more particularly described and specifically claimed as vulcanization accelerators by W. Scott in a copending application, Serial No. 32,188 filed May 22, 1925. The present invention is an improvement upon the various copending applications mentioned and is a continuation in part of the one last indicated.

We have now found that a rubber vulcanization accelerator may be manufactured by reacting butyric aldehyde-dianilide or a like compound with heptaldehyde and the like in the manner as is now described. Such a material is preferably manufactured in steps and may be readily obtained by combining one molecular proportion (72 parts) of butyric aldehyde with two molecular proportions (186 parts) of aniline. In this way butylidene-dianilide is obtained. Inasmuch as this combination takes place very readily and since the reaction is an exothermic one, the reacting mixture will heat up appreciably if the materials are all added at the same time. For this reason, it is preferable to supply suitable stirring means in the reaction vessel and also to provide internal or external heating or cooling means to the vessel in order to maintain the temperature of the mixture uniformly at any chosen point. Inasmuch as decomposition of the product or side reactions may take place if the temperature is allowed to become too high, it is preferable to add the aldehyde at such a rate that the stirring and cooling means will at all times maintain the temperature of the mixture at a point below 35° C.

To the butylidene-dianilide manufactured as above described, there is added one molecular proportion (114 parts) of heptaldehyde. The reaction of this second aldehyde with the dianilide takes place somewhat more slowly than does the first reaction mentioned and the temperature of the mixture is therefore more readily controlled. However, it is preferable to maintain the temperature at all times below 50° C. by employing the cooling means mentioned. In order that the aldehyde may completely react with the dianilide, the product should be allowed to stand for a period of time, with or without stirring as desired.

After the reaction is completed, the water of condensation is drawn off and any residual water remaining in the reaction product is removed by drying, preferably by heating under a vacuum. The product so obtained, in the case of the substances mentioned, is a yellow, oily liquid possessing a specific gravity of 1.080. This material, which is a heptaldehyde reaction product of butylidene-dianilide, is ready for incorporation into a rubber mix in the manner as is hereinafter described. Other accelerators analogous to the one just described may be prepared in a similar manner by the use of other ingredients in place of those mentioned. Thus two molecular proportions of aniline (186 parts) are reacted and combined with one molecular proportion (45 parts) of acetaldehyde while maintaining the temperature below 30° C. The ethylidine dianilide so obtained is then reacted with one molar proportion (114 parts) of heptaldehyde and the product maintained for some time at a temperature below 50° C. The water of condensation is then separated from the material and any residual moisture is removed preferably by drying under a vacuum. The dried product is an orange yellow liquid having a specific gravity of 1.063.

The heptaldehyde derivative of a Schiff's base of the type obtained by interacting equimolecular proportions of an aldehyde and an amine may likewise be readily prepared. Thus two molecular proportions (186 parts) of aniline are reacted with two molecular proportions (140 parts) of croton aldehyde while maintaining the mixture at temperatures below 60° C. In order to avoid over-heating the mixture by the heat evolved during the reaction, it is desirable to add the aldehyde in comparatively small portions with stirring over a period of time. After the aldehyde has been all added the water of condensation may be removed if desired, although in this case, as in the other examples as shown, such intermediate drying is not absolutely necessary. The product so obtained is then further reacted in the manner already described with one-half molar proportion (57 parts) of heptaldehyde and the resulting product dried. The product is a soft, dark red resin.

Products similar to those hereinbefore described may, of course, be prepared by the use of other ingredients than those particularly mentioned. Thus Schiff's bases or aldehyde derivatives thereof prepared by the reaction of equi-molecular proportions of the amine and aldehyde, or by the reaction of two molar parts of the amine with one molar part of aldehyde or by the reaction of three mols of the aldehyde with two mols of the amine or any other proportions may be obtained by reacting together in the necessary proportions primary aromatic amines such as aniline, the toluidines, the xylidines and the like with aldehydes preferably of the aliphatic series, such as formaldehyde, acetaldehyde, propionaldehyde, butyric aldehyde, heptaldehyde or with unsaturated aldehyde such as croton aldehyde, acrolein-aldehyde or with substitute aldehydes such as aldol and the like. The Schiff's bases or the aldehyde derivatives thereof so obtained are then further reacted with heptaldehyde or other aldehyde in the manner as described.

It is not, of course, necessary that heptaldehyde be used only to produce the final reaction product. An amine may be reacted first with heptaldehyde to produce a Schiff's base and this product may then be further reacted with butyric aldehyde, acetaldehyde, croton-aldehyde or with any other aliphatic aldehyde as desired. Although our invention in its preferable form comprises the manufacture and use as an accelerator of vulcanization of the heptaldehyde derivative of butylidine-dianilide, the manufacture and use of any other material wherein heptaldehyde is used either in the preparation of the Schiff's base or the final aldehyde derivative prepared therefrom is within the scope of our present invention.

The materials hereinbefore mentioned may be used in the preparation of vulcanized rubber as are shown by the following examples. If 0.5 parts of the heptaldehyde derivative of butylidine-dianilide be added in the usual manner to a mix previously broken down on the mixing mills and comprising 100 parts of pale crepe rubber, 5 parts of zinc oxide and 3.5 parts of sulphur and the mixture vulcanized in a press for approximately forty-five minutes at the temperature given by 40 pounds of steam pressure per square inch, a vulcanized product is obtained which is found to possess a modulus of elasticity at 300% elongation of 244, at 500% elongation of 635, at 700% elongation of 2735, a load at break of 4425 pounds per square inch and an ultimate elongation of 790%.

Other compounds of the type prepared as disclosed in the present application have likewise shown valuable vulcanization accelerating characteristics when incorporated into into a rubber composition. For example, a vulcanized rubber product has been obtained by employing in place of the accelerator shown in the above rubber composition, 0.5 parts of the material obtained by the reaction of heptaldehyde upon the reaction product of 2 mols of aniline with 1 mol of acetaldehyde. In a like manner, 0.5 parts of the heptaldehyde reaction product of croton-aldehyde-aniline may be employed in place of the accelerator specified in the above rubber mixture. In this case, it is found that a vulcanized rubber product possessing desirable commercial characteristics results after heating the rubber compound containing the accelerators mentioned for a period of about forty-five minutes at the temperature given by substantially forty pounds of steam pressure per square inch.

The accelerators herein mentioned and prepared according to the manner as set forth may likewise be employed in the manufacture of other vulcanized products than the one described. Other rubber mixtures adaptable to the use of the accelerators of the type herein described are apparent to those skilled in the art of rubber compounding.

It is to be understood that the examples given herein are illustrative only and are not limitative of our invention. Broadly, our invention comprises the formation of an aldehyde-amine reaction product wherein there is employed more than a single aldehyde, one of which is heptaldehyde. Preferably the invention comprises the reaction of an aliphatic aldehyde and a primary aromatic amine in other than equi-molecular proportions, such reaction being carried out in a series of steps or stages, in at least one of which steps heptaldehyde is employed. The reaction products obtained by carrying out the process in the manner hereinbefore described are complex products of undetermined constitution and chemical configuration. Our invention is to be understood as not limited by any theories or statements advanced by way of explanation but is limited solely by the claims appended hereto wherein we intend to claim all novelty inherent in our invention as is permissible in view of the prior art.

What we claim is:

1. The process of manufacturing an aldehyde-amine reaction product which comprises reacting more than one aliphatic aldehyde with an aromatic primary amine in a series of steps, in at least one of which steps heptaldehyde is employed.

2. The process of manufacturing an aldehyde-amine reaction product which comprises combining more than one aliphatic aldehyde with an aromatic primary amine in other than equi-molecular proportions, said combination being carried out in a series of steps, in at least one of which steps heptaldehyde is employed.

3. The process of manufacturing an aldehyde-amine reaction product which comprises reacting an aliphatic aldehyde with an aromatic primary amine to form an aldehyde derivative of a Schiff's base and reacting the said product with heptaldehyde.

4. The process of manufacturing an aldehyde-amine reaction product which comprises reacting butyric aldehyde with aniline and reacting the product thereby obtained with heptaldehyde.

5. The process of manufacturing an aldehyde-amine reaction product which comprises reacting butylidene-dianilide with heptaldehyde.

6. The process of manufacturing an aldehyde-amine reaction product which comprises reacting substantially 72 parts of butyric aldehyde with 186 parts of aniline and reacting the product so obtained with substantially 114 parts of heptaldehyde.

7. The process of manufacturing an aldehyde-amine reaction product which comprises reacting butyric aldehyde and aniline in the ratio of substantially one molecular proportion of butyric aldehyde to two molecular proportions of aniline, maintaining the temperature of the reacting materials below 35° C., adding approximately 1 molecular proportion of heptaldehyde to the product so formed and drying the resulting product.

8. The aldehyde-amine reaction product resulting from the treatment of an aromatic primary amine with a plurality of aliphatic aldehydes in a series of steps, in at least one of which steps heptaldehyde is employed.

9. The aldehyde-amine reaction product resulting from the treatment of butylidene-dianilide with heptaldehyde.

10. The aldehyde-amine reaction product resulting by treating the product obtained by reacting substantially two mols of aniline with one mol of butyric aldehyde and one mol of heptaldehyde.

Signed at Akron in the county of Summit and State of Ohio this 1st day of April, A. D. 1926.

CLAYTON OLIN NORTH.
WINFIELD SCOTT.